(No Model.)

P. J. DARCY.
BEER COOLER.

No. 254,120. Patented Feb. 28, 1882.

Witnesses.
C. L. Burdett.
Edwin F. Dimock.

Inventor.
Patrick J. Darcy
by Theo. G. Ellis
Attorney.

N. PETERS, Photo-Lithographer, Washington, D. C.

UNITED STATES PATENT OFFICE.

PATRICK J. DARCY, OF HARTFORD, CONNECTICUT.

BEER-COOLER.

SPECIFICATION forming part of Letters Patent No. 254,120, dated February 28, 1882.

Application filed November 18, 1881. (No model.)

*To all whom it may concern:*

Be it known that I, PATRICK J. DARCY, of Hartford, in the county of Hartford and State of Connecticut, have invented certain new and useful Improvements in Beer-Coolers; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to a device for cooling beer as it is drawn from the cask, by which it is cooled as it is used, instead of being obliged to cool the cask, and thereby diminish the head or pressure, besides the waste of ice in cooling through the wood.

The object of my improvement is to provide a suitable receptacle for the beer just before it is drawn, and in which it is cooled, which shall be tight, so as to maintain the head as received from the cask, and which shall permit of an additional head of air or gas being forced in, if from any cause the beer in the cask becomes slack.

My improvement also permits of a receptacle for bottles of beer to be cooled, and also forms a convenient chamber from which to draw ice-water resulting from the melting of the ice used in cooling.

Figure 1:
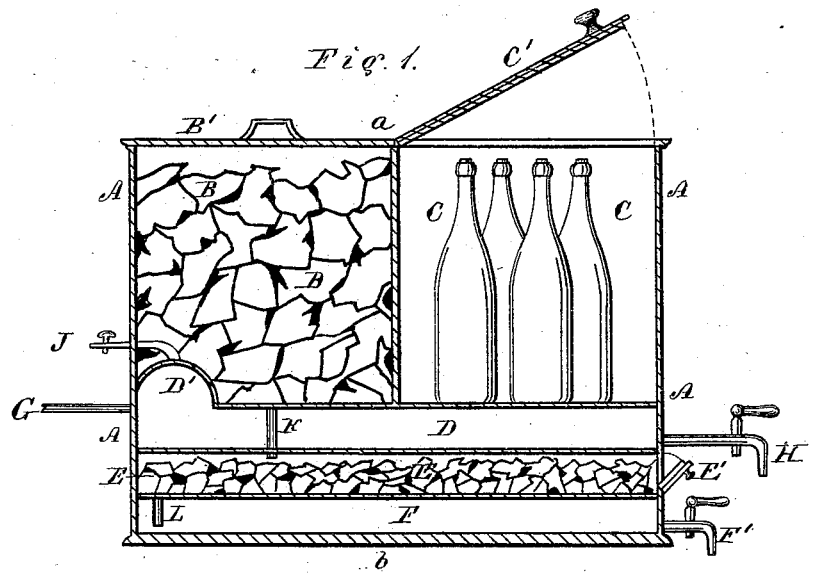
Figure 2:
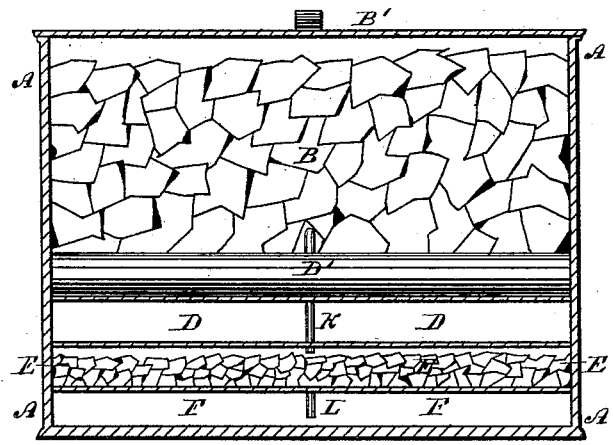

In the accompanying drawings, illustrating my invention, Figure 1 is a longitudinal vertical section through my improved cooler. Fig. 2 is a cross-section through the cooler at *a b* of Fig. 1.

A A is the outside case, of rectangular form, which is divided by interior partitions into chambers B C D E F, as shown in the drawings. These chambers are for different purposes, as will be described. The chambers B and E are for the reception of ice, and are furnished with the doors B' and E' for placing ice within them when required. The chamber C is for the purpose of cooling bottles, and is likewise furnished with the door or cover C' for access to the interior.

D is the chamber for cooling the beer as it comes from the cask. This chamber is tight, and is made sufficiently strong to withstand the pressure from the beer. It is furnished with an inlet-pipe, G, coming from the cask, and a faucet, H, at the opposite end for drawing the beer as required. The beer, while in this chamber, passing between the two ice-receptacles B and E, is cooled to a very low temperature. This to a certain extent reduces the pressure or head of the beer in the chamber; but the pressure is supplied from the cask, which remains at its original temperature and is not affected by the cooling process.

At the end of the chamber D is the raised portion or air-chamber D'. This is shown as of the form of part of a cylinder extending across the cooler. Proceeding from its top and extending outward through the side of the outer case are the pipe and cock J. This is for the purpose of relieving any extra or undue pressure, when required, or for the purpose of forcing in air or gas to increase the pressure, if the beer becomes slack.

F is the chamber for receiving the drip from the melted ice used in cooling. It is furnished with the faucet F' for drawing it out when desired. It furnishes a supply of ice-water always ready for use.

K is a pipe leading from the ice-chamber B through the beer-chamber D to the ice-chamber E, for the purpose of carrying the water from the melted ice into the receiver beneath. It passes tight through the partitions above and below D.

L is a drip-pipe from the chamber E into the water-receiver F below it. It carries the water from both the ice-chambers B and E into the water-receiver.

My improved cooler is intended to be placed where it is wished to draw the beer for use, and the cask may be placed near it, or as far away as may be convenient. It is connected with the cooling device by means of a suitable pipe.

A modification of my invention can be made by dispensing with the horizontal partition between the chambers E and F and allowing the under side of the beer-chamber to be cooled either by the cold water alone or by ice and water, as may be found most convenient.

What I claim as my invention is—

1. In combination with a tight beer-chamber, D, provided with the inlet and outlet pipes G H, and the air-chamber D', provided with the cock J, the cooling-chambers C and E, above and below said beer-chamber, connected by the drip-pipe K, substantially as described.

2. In combination with the beer-chamber D, the ice-receptacles B and E and the separate cold-water receiver F, provided with the faucet F', and connected with the ice-receptacles by the pipes K and L, substantially as described.

PATRICK J. DARCY.

Witnesses:
WILMOT HORTON,
THEO. G. ELLIS.